United States Patent [19]
Ko

[11] Patent Number: 6,145,396
[45] Date of Patent: Nov. 14, 2000

[54] TRANSMISSION WITH A THREADED ROD WHICH IS ENGAGED THREADABLY WITHIN AN OUTPUT GEAR AND WHICH IS MOVABLE AXIALLY ON A THRUST BEARING

[76] Inventor: Chen-Hui Ko, No. 21-3, Lin 16, Feng-Shu Tsun, Kuei-Shan, Hsiang, Tao-Yuan Hsien, Taiwan

[21] Appl. No.: 09/291,727

[22] Filed: Apr. 14, 1999

[30] Foreign Application Priority Data

Dec. 31, 1998 [TW] Taiwan ................................. 87222092

[51] Int. Cl.[7] ............................. F16H 27/02; F16H 29/02
[52] U.S. Cl. .................................. 74/89.15; 74/424.8 R; 74/459
[58] Field of Search ........................... 74/89.15, 424.8 R, 74/459, 412 R, 413, 606 R

[56] References Cited

U.S. PATENT DOCUMENTS

| | | | |
|---|---|---|---|
| 4,903,535 | 2/1990 | Kikuta et al. | 74/89.15 |
| 5,086,900 | 2/1992 | Kikuta et al. | 74/89.15 |
| 5,472,065 | 12/1995 | Vergin | 74/89.15 |

*Primary Examiner*—David Fenstermacher
*Attorney, Agent, or Firm*—Limbach & Limbach L.L.P.

[57] ABSTRACT

A transmission includes an output gear, which has an integral shaft that is formed with a threaded axial hole and that has a long shaft section and a short shaft section. The output gear is disposed between a first housing half and a second housing half, which are formed with first and second cylindrical portions, respectively. The long shaft section is disposed rotatably within the first cylindrical portion. The short shaft section and a thrust bearing are disposed rotatably within the second cylindrical portion. As such, a threaded rod which engages the threaded axial hole in the shaft can move axially and smoothly on the first and second housing halves, thereby reducing output torque loss of the threaded rod when moving in a first direction. Because the first and second housing halves are interconnected removably, by reassembling the transmission, the long shaft section can be moved into the second cylindrical portion, while the short shaft section and the thrust bearing can be moved into the first cylindrical portion. In this case, when the threaded rod moves in a second direction that is opposite to the first direction, the output torque loss thereof can be reduced.

5 Claims, 5 Drawing Sheets

6,145,396

TRANSMISSION WITH A THREADED ROD WHICH IS ENGAGED THREADABLY WITHIN AN OUTPUT GEAR AND WHICH IS MOVABLE AXIALLY ON A THRUST BEARING

BACKGROUND OF THE INVENTION

1. Field of the Invention

This invention relates to a transmission with an output gear for moving axially a threaded rod, which is engaged threadably within the output gear, more particularly to a transmission with a thrust bearing, which facilitates smooth axial movement of the threaded rod.

2. Description of the Related Art

The improvement of this invention is directed to a conventional transmission, which is used to adjust a slope of a foot-supporting member of a treadmill that serves as a leg exerciser. Referring to FIG. 1, the conventional transmission 10 is shown to include a gear box 11 in which a reduction gearing 12 is disposed. The reduction gearing 12 includes three unitary speed-reducing elements 13, 14, 15, and an output gear 16. Each of the speed-reducing elements 13, 14, 15 has a large gear 131, 141, 151, and a small gear 132, 142, 152. When a motor 90 is powered, a bevel gear 91 that is fixed on a motor shaft of the motor 90 rotates the large gear 131 so that the small gear 152 rotates the output gear 16. The bevel gear 91 has an end 911, which is biased by a spring 92 to press a washer 18 against a side surface of the large gear 141. As such, when power to drive the motor 90 is switched off, rotation of the elements 13, 14, 15 stops. The output gear 16 has an integral shaft 161, which is formed with a threaded axial hole 162. An externally threaded rod 17 is engaged within the threaded axial hole 162 in the shaft 161. Accordingly, when power to drive the motor 9 is switched on, rotation of the bevel gear 91 is converted into axial movement of the threaded rod 17. The aforementioned conventional transmission suffers from the following disadvantages:

(1) Because there is no bearing provided between the threaded rod 17 and the gear box 11, the threaded rod 17 cannot move smoothly in the gear box 11. Furthermore, friction between external threads on the rod 17 and internal threads in the shaft 161 reduces largely the output torque of the transmission 12.

(2) It is more difficult to effect upward movement of the threaded rod 17 than downward movement of the same due to the weight of the load that is carried on the top end of the rod 17. Accordingly, the transmission 12 is equipped normally with a control circuit device (not shown), which is selected according to the type of the load, thereby increasing the manufacturing costs.

SUMMARY OF THE INVENTION

The object of this invention is to provide a transmission with a thrust bearing, which can be provided selectively on either side of an output gear to reduce loss in the output torque of the transmission in a direction, thereby permitting mechanical adjustment to produce two different output torques in opposite directions.

According to this invention, a transmission includes an output gear, which has an integral shaft that is formed with a threaded axial hole and that has a long shaft section and a short shaft section. The output gear is disposed between a first housing half and a second housing half, which are formed with first and second cylindrical portions, respectively. The long shaft section is disposed rotatably within the first cylindrical portion. The short shaft section and a thrust bearing are disposed rotatably within the second cylindrical portion. As such, a threaded rod which engages the threaded axial hole in the shaft can move axially and smoothly on the first and second housing halves, thereby reducing output torque loss of the threaded rod when moving in a first direction. Because the first and second housing halves are interconnected removably, by reassembling the transmission, the long shaft section can be moved into the second cylindrical portion, while the short shaft section and the thrust bearing can be moved into the first cylindrical portion. In this case, when the threaded rod moves in a second direction that is opposite to the first direction, the output torque loss thereof can be reduced. An output torque difference of the transmission between two opposite directions in which the threaded rod moves on the first and second housing halves can thus be achieved mechanically.

BRIEF DESCRIPTION OF THE DRAWINGS

Other features and advantages of this invention will become apparent in the following detailed description of a preferred embodiment of this invention, with reference to the accompanying drawing, in which.

DETAILED DESCRIPTION OF THE PREFERRED EMBODIMENT

Figure 1:
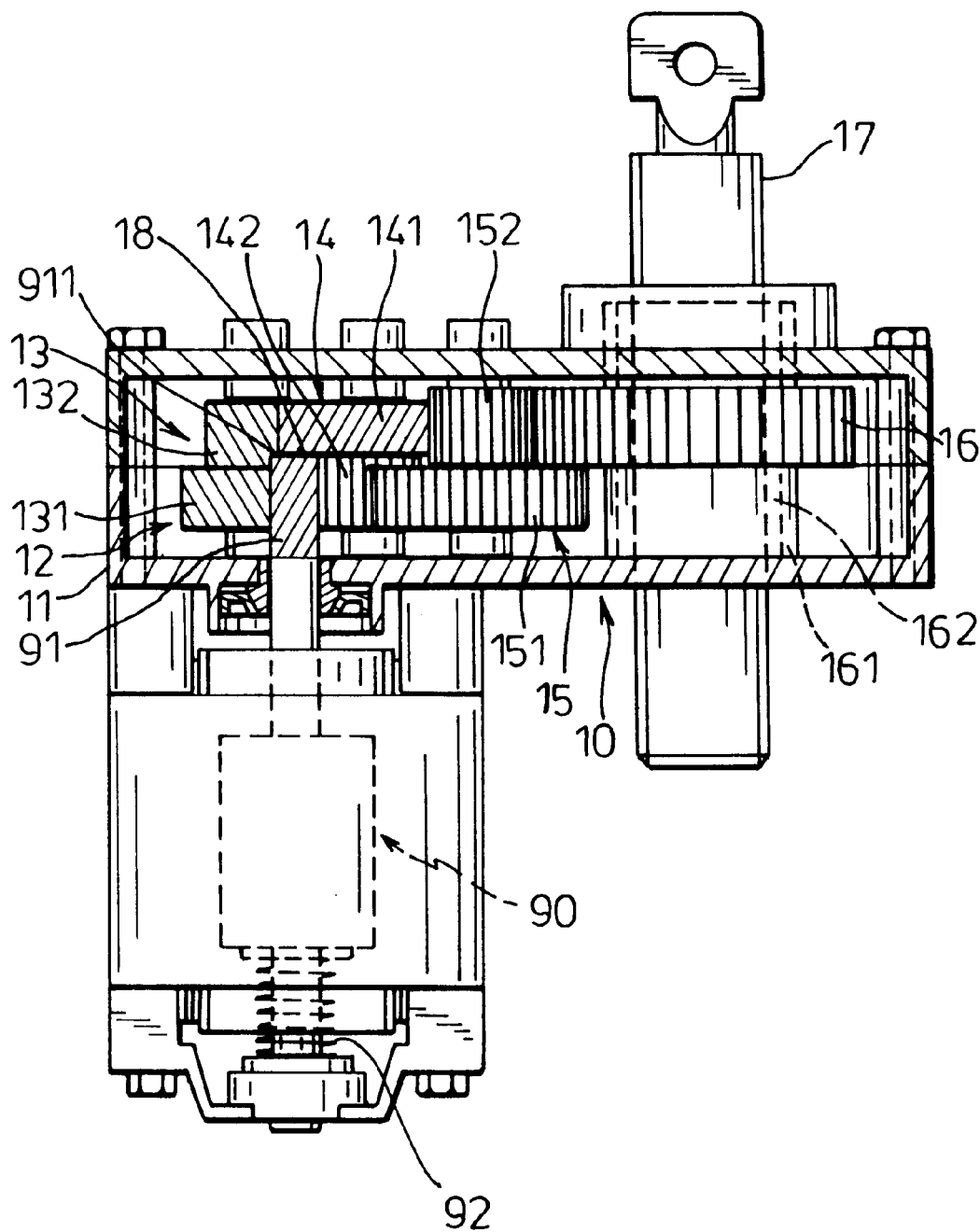
FIG. 1 is a schematic side view illustrating an interior structure of a conventional transmission.
Figure 2:
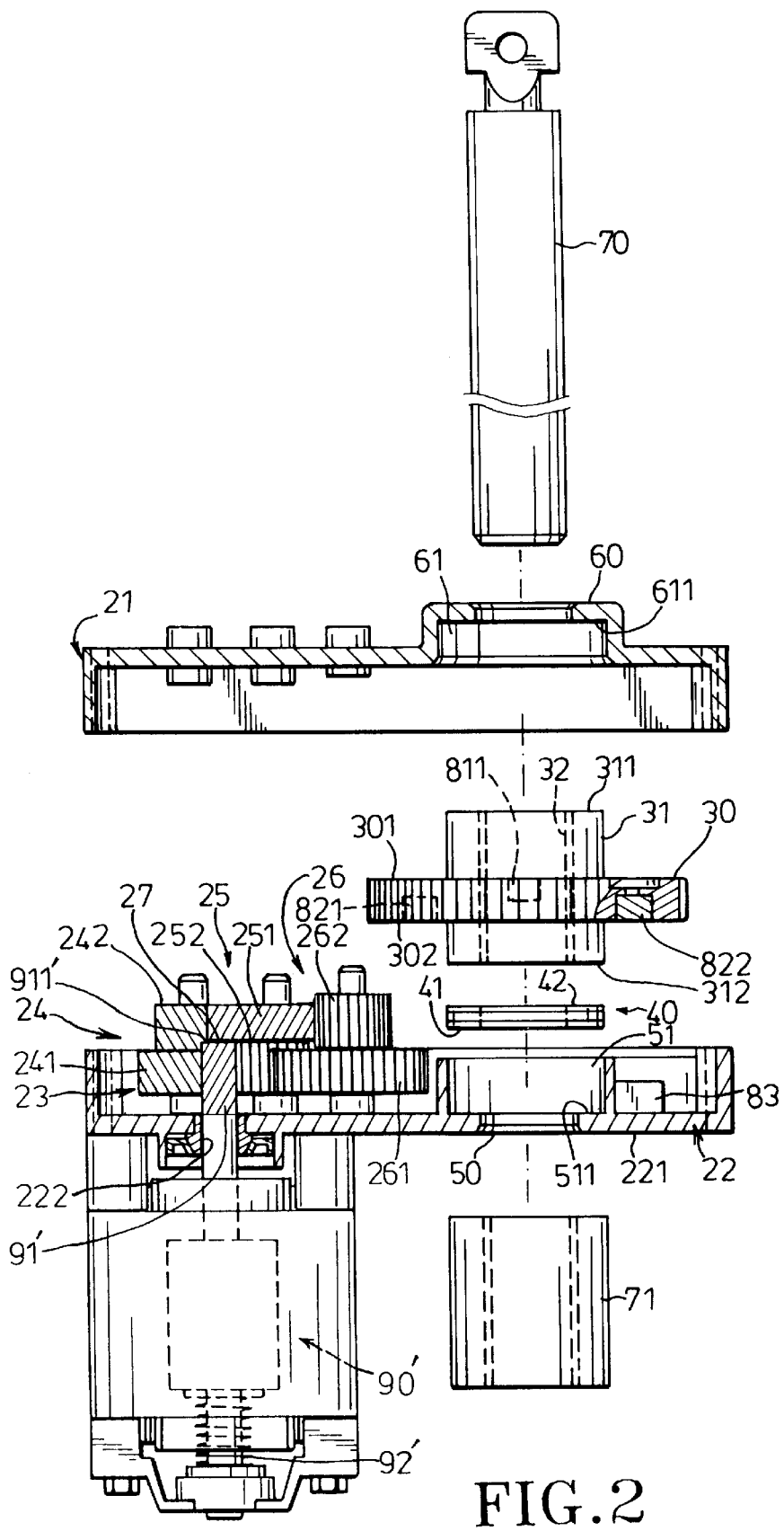
FIG. 2 is an exploded side view of the preferred embodiment of a transmission according to this invention.
Figure 3:
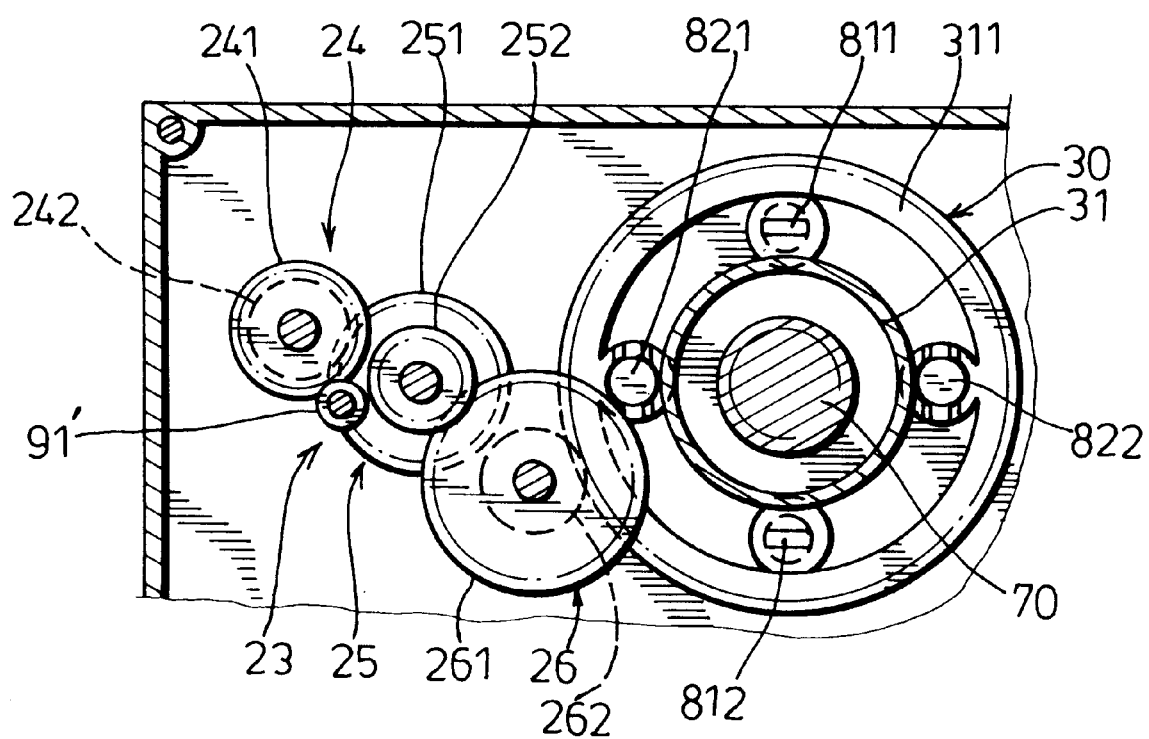
FIG. 3 is a schematic, fragmentary sectional bottom view illustrating a reduction gearing of the preferred embodiment.
Figure 4:
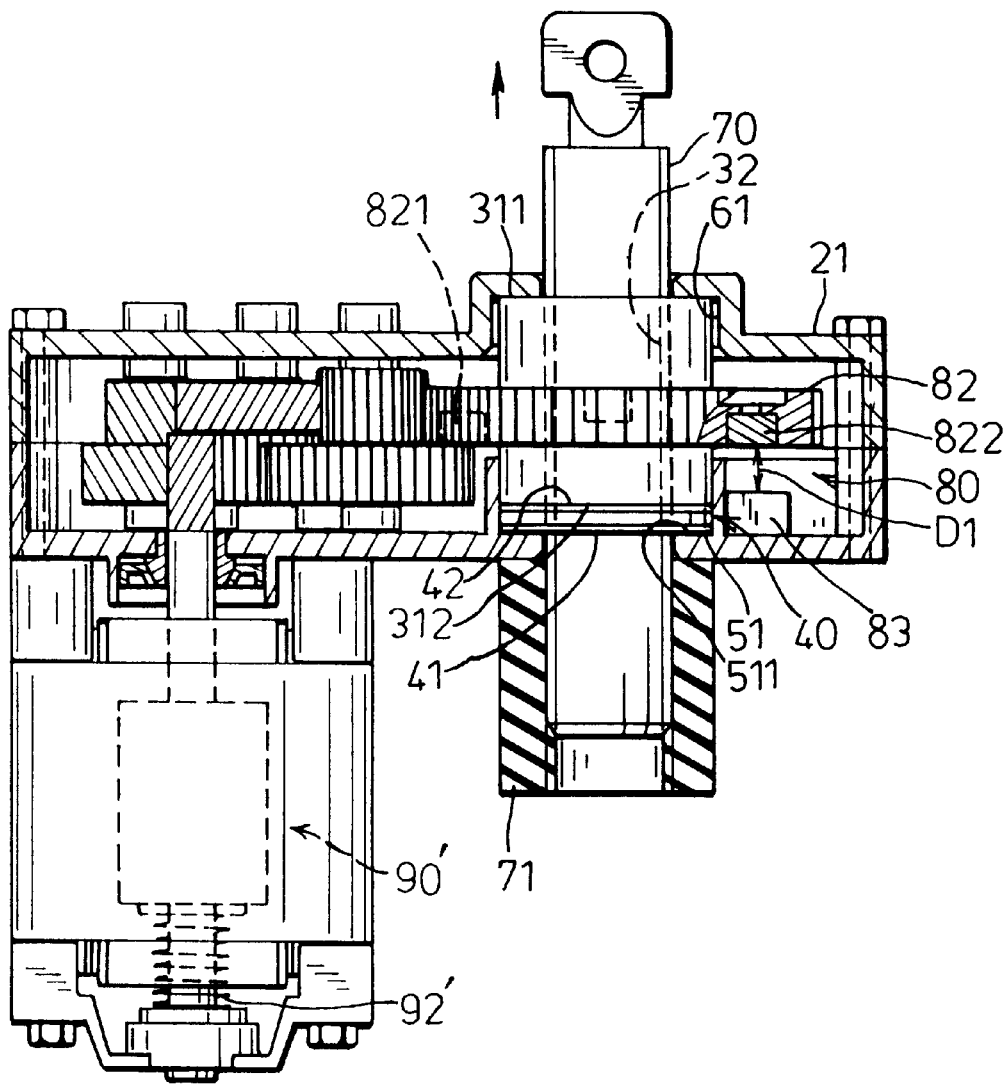
FIG. 4 is a schematic side view illustrating how a thrust bearing is provided under an output gear of the preferred embodiment.

Referring to FIGS. 2, 3 and 4, the preferred embodiment of a transmission according to this invention is shown to include a first housing half 21 and a second housing half 22, between which a reduction gearing 23 is disposed. The first housing half 21 is bolted to and is located over the second housing half 22. The reduction gearing 23 includes three unitary speed-reducing elements 24, 25, 26, and an output gear 30. Each of the speed-reducing elements 24, 25, 26 has a large gear 241, 251, 261, and a small gear 242, 252, 262. When a motor 90' is powered, a bevel gear 91' that is fixed on a motor shaft of the motor 90' rotates the large gear 241 so that the small gear 262 rotates the output gear 30. The bevel gear 91' has an end 911', which is biased by a spring 92' to press a washer 27 against a side surface of the large gear 251. As such, when power to drive the motor 90' is switched off, rotation of the elements 24, 25, 26 stops. The output gear 30 is formed integrally with a shaft 31, which has a threaded axial hole 32 formed therethrough. An externally threaded rod 70 is engaged within the threaded axial hole 32 in the shaft 31. Accordingly, when power to drive the motor 90' is switched on, rotation of the bevel gear 91' is converted into axial movement of the threaded rod 70.

The first housing half 21 has a hollow first cylindrical portion 60, which defines a cylindrical chamber 61 and a first end wall 611.

The second housing half 22 has a hollow second cylindrical portion 50, which defines a cylindrical chamber 51 and a second end wall 511.

The shaft 31 is divided by the output gear 30 into a long shaft section 311 and a short shaft section 312, which are located on two sides of the output gear 30 and which are disposed respectively and rotatably within the first and second cylindrical portions 60, 50.

A thrust bearing 40 is disposed in the second cylindrical portion 50 of the second housing half 22, and is clamped between the short shaft section 312 of the shaft 31 and the second end wall 511 of the second housing half 22. Total axial length of the thrust bearing 40 and the short portion 312 of the shaft 31 is equal or approximate to axial length of the long shaft section 312 of the shaft 31, and is longer than axial length of either of the cylindrical chambers 51, 61.

The threaded rod 70 includes a protective sleeve 71, which is sleeved tightly on an end portion thereof.

A counter device indicates the rotational number of the output gear 30, and includes a first magnetic unit 81 (see FIG. 5), a second magnetic unit 82 (see FIG. 4), and a magnetic sensor 83. The output gear 30 has a first side portion 301 from which the long shaft section 311 of the shaft 31 extends integrally, and a second side portion 302 from which the short shaft section 312 of the shaft 31 extends integrally.

The first magnetic unit 81 (see FIG. 5) is attached to the first side portion 301 of the output gear 30, while the second magnetic unit 82 (see FIG. 4) is attached to the second side portion 302 of the output gear 30. The sensor 83 is attached to the second housing half 22, and is spaced apart from the output gear 30 at an axial distance (D1) (see FIG. 4).

When it is desired to move the threaded rod 70 upward or downward, power to drive the motor 90' is switched on. Static friction between external threads on the threaded rod 70 and internal threads in the shaft 31 generates loss in the output of the transmission. The thrust bearing 40 facilitates smooth movement of the threaded rod 70 on the first and second housing halves 21, 22, and reduces loss in the output of the transmission obtained from downward movement of the threaded rod 70. Accordingly, in a case where the input to the reduction gearing 23 is fixed by controlling rotation of the motor 90' in an opposite direction, upward displacement of the threaded rod 70 is smaller than downward displacement of the same. As such, the structure of FIG. 4 can be used in a treadmill that serves as a leg exerciser. In this case, an upper end portion of a foot-supportingmember (not shown) is connected pivotally to an upper end portion of the threaded rod 70. The weight of the foot-supporting plate (not shown) forms a downward pushing force on the upper end portion of the threaded rd 70. Under this condition, it is difficult to effect upward movement of the threaded rod 70 than downward movement of the same.

Figure 5:
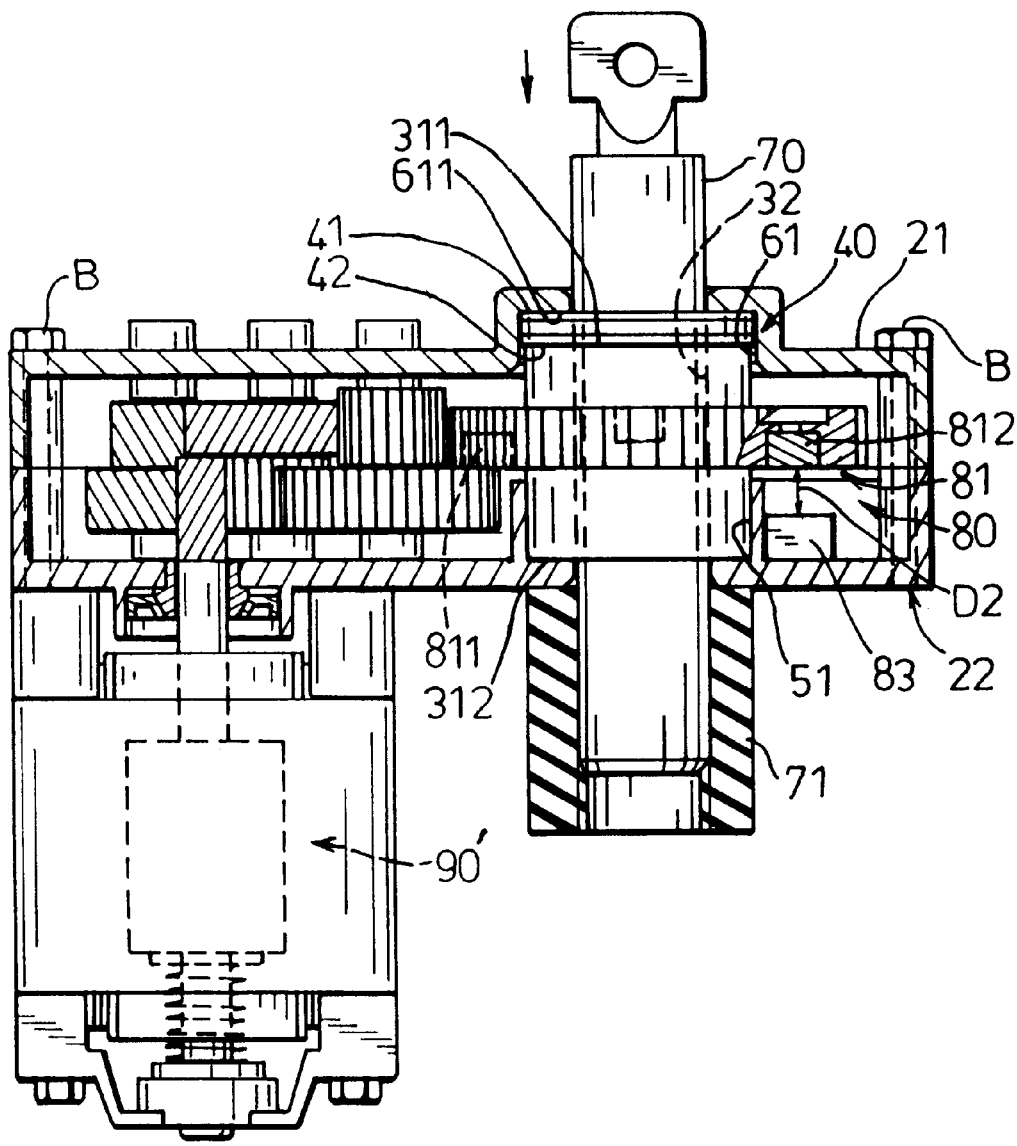
FIG. 5 is a schematic side view illustrating how the thrust bearing is provided over the output gear of the preferred embodiment.

If it is desired to apply an upward pulling force to the upper end portion of the threaded rod 70, the transmission can be adjusted into the structure shown in FIG. 5, in which the sensor 83 is spaced apart from the output gear 30 at an axial distance (D2). To effect this adjustment, two bolts (B) are unscrewed from the first housing half 21, thereby permitting removal of the first housing half 21 from the second housing half 22. The short shaft section 312 of the shaft 31 and the thrust bearing 40 are removed from the second housing half 22. The long shaft section 311 of the shaft 31 is inserted into the cylindrical chamber 51 in the second housing half 22. The thrust bearing 40 is placed on the upper end surface of the short shaft section 312 of the shaft 31. The first housing half 21 is bolted to the second housing half 22 to engage the thrust bearing 40 and the short shaft section 312 of the shaft 31 within the cylindrical chamber 61 in the first housing half 21. The threaded rod 70 extends through the first and second housing halves 21, 22. Finally, the protective sleeve 71 is sleeved on the lower end portion of the threaded rod 70.

With this invention thus explained, it is apparent that numerous modifications and variations can be made without departing from the spirit and scope of this invention. It is therefore intended that this invention be limited only as indicated by the appended claims.

I claim:

1. A transmission comprising:

a first housing half having a hollow first cylindrical portion, which has a first end wall;

a second housing half connected removably to said first housing half and having a second hollow cylindrical portion, which has a second end wall, each of said first and second cylindrical portions defining a cylindrical chamber;

an output gear;

a shaft formed integrally with said output gear and having a threaded axial hole that is formed therethrough, said shaft being divided by said gear into a long shaft section and a short shaft section, which are located on two sides of said gear and which are disposed rotatably within said first and second cylindrical portions, respectively, said long shaft section being longer than said short shaft section;

a thrust bearing disposed in said second cylindrical portion of said second housing half and clamped between said short shaft section of said shaft and said second end wall, total axial length of said thrust bearing and said short shaft section of said shaft being longer than axial length of either of said cylindrical chambers and being approximate to axial length of said long shaft section of said shaft; and a threaded rod extending threadably through said threaded hole in said shaft to convert rotation of said gear into axial movement of said threaded rod;

whereby, positions of said long and short shaft sections of said shaft can be exchanged between said first and second housing halves to locate said long and short shaft sections in said second and first cylindrical portions, respectively.

2. A transmission as claimed in claim 1, further comprising a counter device, which indicates rotational number of said gear and which includes a first magnetic unit, a second magnetic unit, and a magnetic sensor, said gear having a first side portion from which said long shaft section of said shaft extends integrally, and a second side from which said short shaft section of said shaft extends integrally, said first magnetic unit being attached to said first side portion of said gear, said second magnetic unit being attached to said second side portion of said gear, said sensor being attached to one of said first and second housing halves.

3. A transmission as claimed in claim 2, wherein each of said first and second magnetic units includes two diametrically opposed magnetic elements, each of which can rotate to align axially with said sensor.

4. A transmission as claimed in claim 3, wherein each of said magnetic elements is a magnet.

5. A transmission as claimed in claim 1, wherein said threaded rod includes a protective sleeve, which is sleeved on an end portion thereof.

* * * * *